United States Patent
Bush et al.

(10) Patent No.: US 9,876,390 B2
(45) Date of Patent: Jan. 23, 2018

(54) TECHNIQUES FOR IMPROVING OPERATION OF STATIC TRANSFER SWITCHES DURING VOLTAGE DISTURBANCES

(71) Applicant: Liebert Corporation, Columbus, OH (US)

(72) Inventors: Terry D. Bush, Westerville, OH (US); Brian P. Heber, Delaware, OH (US); Russell E. Shetler, Jr., Delaware, OH (US); Peter A. Panfil, Columbus, OH (US)

(73) Assignee: Liebert Corporation, Columbus, OH (US)

( * ) Notice: Subject to any disclaimer, the term of this patent is extended or adjusted under 35 U.S.C. 154(b) by 1116 days.

(21) Appl. No.: 14/055,311

(22) Filed: Oct. 16, 2013

(65) Prior Publication Data

US 2014/0132074 A1    May 15, 2014

Related U.S. Application Data

(60) Provisional application No. 61/725,648, filed on Nov. 13, 2012.

(51) Int. Cl.
*H02J 9/06*         (2006.01)
*H02J 9/00*         (2006.01)

(52) U.S. Cl.
CPC ............. *H02J 9/06* (2013.01); *H02J 9/00* (2013.01); *Y10T 307/615* (2015.04); *Y10T 307/625* (2015.04); *Y10T 307/747* (2015.04)

(58) Field of Classification Search
CPC .......... H02J 9/06; H02J 9/00; Y10T 307/747; Y10T 307/625; Y10T 307/615
See application file for complete search history.

(56) References Cited

U.S. PATENT DOCUMENTS

| | | | | |
|---|---|---|---|---|
| 3,401,327 A | * | 9/1968 | Leppert | H02M 7/53806 363/25 |
| 3,444,455 A | * | 5/1969 | Johnson | G05F 1/452 307/104 |
| 3,456,133 A | * | 7/1969 | Warren | G05F 1/445 315/196 |
| 5,210,685 A | | 5/1993 | Rosa | |
| 6,295,215 B1 | | 9/2001 | Faria et al. | |

(Continued)

FOREIGN PATENT DOCUMENTS

CN      1918769 A    2/2007
CN    102246598 A   11/2011
(Continued)

*Primary Examiner* — Jared Fureman
*Assistant Examiner* — Emmanuel R Dominique
(74) *Attorney, Agent, or Firm* — Harness, Dickey & Pierce, P.L.C.

(57) ABSTRACT

When the preferred voltage source for a static transfer switch is a UPS, there can be a brief interruption in the voltage received from the UPS while the UPS is switching from economy mode to normal mode. Operation of the static transfer switch can be improved during such voltage disturbances. Specifically, the static transfer switch may be in data communication with the UPS and thereby made aware that the voltage disturbance is temporary. As a result, the static transfer switch can avoid an unnecessary transfer to an alternate voltage source.

16 Claims, 6 Drawing Sheets

(56) References Cited

U.S. PATENT DOCUMENTS

| | | | | |
|---|---|---|---|---|
| 6,601,002 B1* | 7/2003 | Ennis | ............... | H02H 7/266 |
| | | | | 307/130 |
| 9,013,157 B2* | 4/2015 | Vollmar | ............... | H02M 5/257 |
| | | | | 323/258 |
| 2002/0109410 A1* | 8/2002 | Young | ............... | H02J 3/32 |
| | | | | 307/64 |
| 2002/0131788 A1 | 9/2002 | Nakaya | | |
| 2005/0184592 A1* | 8/2005 | Marwali | ............... | H02J 3/005 |
| | | | | 307/52 |
| 2006/0226706 A1* | 10/2006 | Edelen | ............... | H02J 9/06 |
| | | | | 307/64 |
| 2008/0185914 A1* | 8/2008 | Randall | ............... | H02J 9/061 |
| | | | | 307/64 |
| 2008/0231252 A1* | 9/2008 | Nho | ............... | H02J 3/1814 |
| | | | | 323/350 |
| 2008/0278003 A1 | 11/2008 | Pouchet et al. | | |
| 2012/0119581 A1 | 5/2012 | Silberbauer et al. | | |

FOREIGN PATENT DOCUMENTS

| | | | |
|---|---|---|---|
| EP | 1710890 | A2 | 10/2006 |
| EP | 2536000 | A2 * | 12/2012 |
| EP | 2536000 | A2 | 12/2012 |
| WO | WO-9816985 | A1 | 4/1998 |
| WO | WO-2008023861 | A1 | 2/2008 |

* cited by examiner

TECHNIQUES FOR IMPROVING OPERATION OF STATIC TRANSFER SWITCHES DURING VOLTAGE DISTURBANCES

CROSS-REFERENCE TO RELATED APPLICATIONS

This application claims the benefit of U.S. Provisional Application No. 61/725,648, filed on Nov. 13, 2012. The entire disclosure of the above application is incorporated herein by reference.

FIELD

The present disclosure relates generally to static transfer switches and, more particularly, to techniques for improving operation of a static transfer switch during voltage disturbances, including those created upstream by a UPS system.

BACKGROUND

Uninterruptible power supply (UPS) systems with economy modes of operation typically create voltage disturbances on the output voltage when transitioning between modes of operation. For example, if a utility source line to ground fault condition occurs while in an economy mode, there will be a severe voltage sag until such time that the system transitions to a normal mode of operation. The temporary voltage disturbance would normally be interpreted by a static transfer switch as a source failure and thereby result in a transfer to an alternate source by the static transfer switch. In some arrangements, the transfer to the alternate source may be undesirable. For example, if the alternate source is a standby source shared by several static transfer switches, resources of the standby source may need to be kept in reserve for more critical applications. Therefore, it is desirable to improve operation of a static transfer switch during voltage disturbances, including those created by an upstream UPS system.

This section provides background information related to the present disclosure which is not necessarily prior art.

SUMMARY

This section provides a general summary of the disclosure, and is not a comprehensive disclosure of its full scope or all of its features.

When the preferred voltage source for a static transfer switch is a UPS, there can be a brief interruption in the voltage received from the UPS while the UPS is switching from economy mode to normal mode. In one aspect of this disclosure, operation of the static transfer switch is improved during such voltage disturbances. Specifically, the static transfer switch may be in data communication with the UPS and thereby made aware that the voltage disturbance is temporary. As a result, the static transfer switch can avoid an unnecessary transfer to an alternate voltage source.

The static transfer switch may include a first switch arrangement electrically connected between a preferred input terminal and the load terminal, and a second switch arrangement electrically connected between an alternate input terminal and the load terminal, where the preferred input terminal is configured to receive an AC input signal from a preferred voltage source, such as UPS, and the alternate input terminal is configured to receive an AC input signal from an alternate voltage source. The first and second switch arrangements are comprised of one or more semiconductor switches.

A controller is interfaced with the semiconductor switches in the first and second switch arrangements. In some embodiments, the semiconductor switches are further defined as silicon-controlled rectifiers. In other embodiments, the first and second switch arrangements are comprised of two silicon-controlled rectifiers arranged in parallel with each other in a back-to-back configuration. The controller monitors the voltage at the load terminal and controls the conductive state of the semiconductor switches to selectively output voltage from either the preferred input terminal or the alternate input terminal to the load terminal. The controller may control the conductive state of the semiconductor switches using phase fired control.

The static transfer switch may be further configured with a data port to receive a message via a data link from a device associated with the preferred voltage source, where the message is indicative of a voltage disturbance in the voltage signal received from the preferred voltage source. In response to receiving the message, the controller controls the conductive state of the semiconductor switches to change waveform of the voltage signal output by the first switch arrangement to the load terminal in a manner that avoids magnetic flux saturation in a downstream transformer.

In one aspect, upon detecting a voltage disturbance in a given half cycle of the voltage signal, the controller places the semiconductor switches in a non-conductive state during a next half cycle of the voltage signal immediately following the given half cycle.

In another aspect, the controller determines a quantity of sag in nominal waveform of the voltage signal in a given half cycle of the voltage signal and controls conductive state of the semiconductor switches such that magnitude of voltage output by the first switch arrangement during the next half cycle correlates to the quantity of sag. Specifically, the magnitude of voltage output by the first switch arrangement during the given half cycle is substantially equal to magnitude of voltage output by the first switch arrangement during the next half cycle.

When the preferred voltage source is further defined as an uninterruptible power supply (UPS), the message is received from the UPS and indicates a transition from an economy mode of operation to a normal node of operation by the UPS.

The static transfer switch may also be configured to receive a message from a device associated with the alternate voltage source such that the controller operates to couple the alternate input terminal to the load terminal based in part of the message received from the other device.

Further areas of applicability will become apparent from the description provided herein. The description and specific examples in this summary are intended for purposes of illustration only and are not intended to limit the scope of the present disclosure.

DRAWINGS

Figure 1:
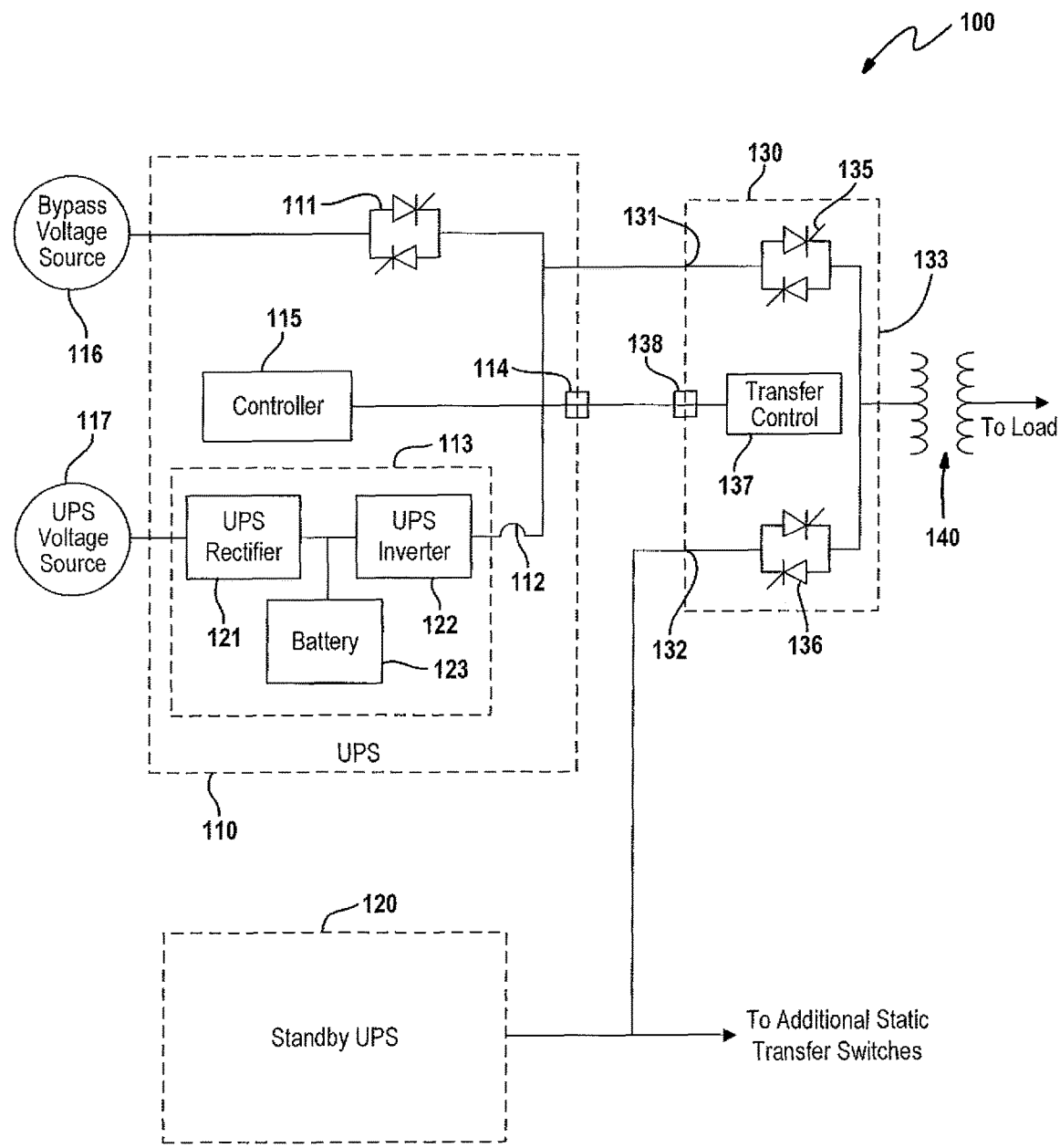
FIG. 1 is a schematic of an exemplary power supply system.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 is a simplified schematic of an exemplary power supply system 100. The power supply system 100 is comprised generally of an uninterruptible power supply (UPS) 110, a standby UPS 120, and a static transfer switch 130. In addition to the static transfer switch 130, the standby UPS 120 may also be electrically coupled to other static transfer switches (not shown). In some arrangements, a transformer 140 may be electrically coupled to an output of the static transfer switch 130.

An uninterruptible power supply (UPS) 110 is typically used to protect computers, data centers, telecommunications equipment or other electrical equipment. The UPS 110 generally includes a bypass switch 111, a UPS switch 112, a UPS converter 113, an output terminal 114 and a controller 115. The bypass switch 111 is coupled between a bypass voltage source 116 and the output terminal 114 and configured to receive an AC input signal from the bypass voltage source 116. In a similar manner, the UPS converter 113 is coupled between a UPS voltage source 117 and the output terminal 114 and configured to receive an AC signal from the UPS voltage source 117. The UPS switch 112 is interposed between an output of the UPS converter 113 and the output terminal 114.

The UPS converter 113 further includes a rectifier 121, an inverter 122 and a battery 123. The rectifier 121 converts the AC input from an AC signal to a DC signal; whereas, the inverter 122 converts a DC signal to an AC signal. The inverter 122 is configured to receive an input signal from either the rectifier 121 or the battery 123. The battery 123 supplies the input signal to the inverter 122 if the UPS voltage source 117 is not available. Such converter arrangements are known in the art.

Figure 2:
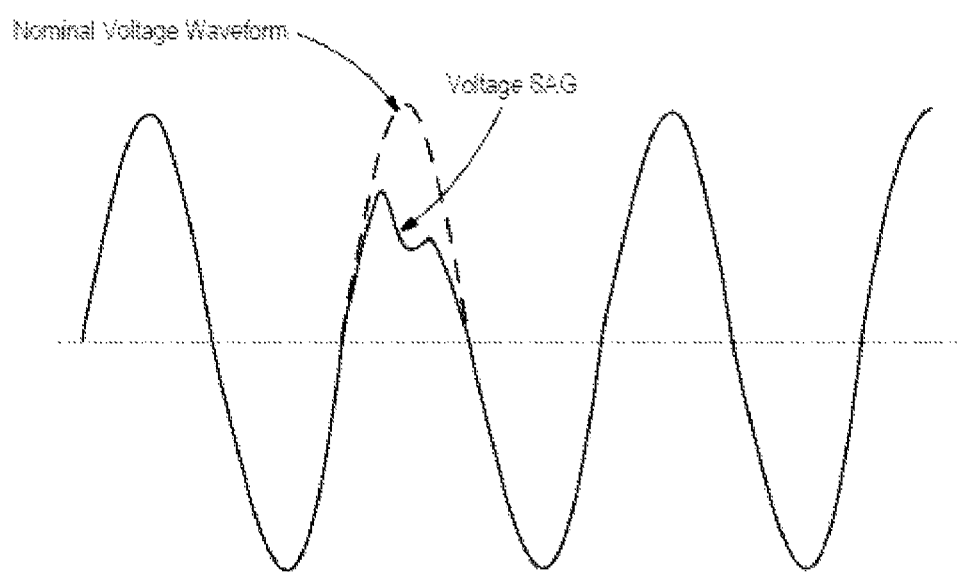
FIG. 2 is a graph illustrating a voltage sag created, for example during a transition by a UPS from an economy mode to a normal mode.

In normal mode of operation, the UPS switch 112 is closed while the bypass switch 111 is open such that the UPS converter 113 supplies power to the load. If the UPS fails, the bypass switch 111 is closed and the UPS switch 112 is opened so that the bypass source 116 supplies power to the load (which is commonly referred to as bypass mode). In economy mode, the bypass switch 111 and the UPS switch 112 are both closed. In this arrangement, the bypass source 116 supplies power to the load but the UPS converter 113 is available to supply power immediately if the bypass source 116 fails. When the bypass source fails, there can be a brief interruption of voltage at the output terminal 114 while switching from economy mode to normal mode. A voltage sag created during the transition from economy mode to normal mode is illustrated in FIG. 2. This voltage sag may be interpreted by the static transfer switch 130 as a source failure and may result in a transfer to an alternate source as will be further described below.

The controller 115 monitors the operating conditions of the UPS 110 and controls the bypass switch 111 and the UPS switch 112 depending on the selected mode of operation and the operating conditions. In an exemplary embodiment, the controller 46 is implemented as a microcontroller. In other embodiments, controller may refer to, be part of, or include an Application Specific Integrated Circuit (ASIC); an electronic circuit; a combinational logic circuit; a field programmable gate array (FPGA); a microprocessor that executes code; other suitable components that provide the described functionality; or a combination of some or all of the above.

The controller 115 further operates to transmit a message over a data link, where the message is generally indicative of an expected voltage disturbance or an actual voltage disturbance in the voltage signal output by the UPS. For example, the message may be indicative of a transition from an economy mode to a normal mode of operation and thus is transmitted substantially concurrently with the occurrence of this event. In one embodiment, the UPS 110 is configured with a serial data port 116 and the controller 115 is in data communication with the serial data port. In this embodiment, the message may be sent serially by the controller 115 via the serial data port 116 to another device coupled to the UPS. It is understood that the message may be sent using other types of wired or wireless data links (e.g., parallel communication or Bluetooth wireless technology).

The static transfer switch 130 is comprised generally of a preferred input terminal 131, an alternate input terminal 132, a load terminal 133, a first switch arrangement 135, a second switch arrangement 136 and a controller 137. The preferred input terminal 131 is configured to receive electric power from a preferred voltage source, such as UPS 110; whereas, the alternate input terminal 132 is configured to receive electric power from an alternate voltage source, such as standby UPS 120.

The first switch arrangement 135 is electrically connected between the preferred input terminal 131 and the load terminal 133. The first switch arrangement 135 includes one or more semiconductor switches. In an exemplary embodiment, the semiconductor switches are implemented as silicon-controlled rectifiers (SCR). In the context of a single-phase load, the first switch arrangement 135 includes two silicon-controlled rectifiers arranged in parallel with each other in a back-to-back configuration as shown in FIG. 1. It is understood that a similar switch arrangement may be used on each leg in a three phase load application. Moreover, it is understood that other types of thyristors and/or semiconductor switches fall within the scope of this disclosure.

The second switch arrangement 136 is electrically connected between the alternate input terminal 132 and the load terminal 133. The second switch arrangement 136 also include one or more semiconductor switches and may be implemented in a manner similar to the first switch arrangement 135 described above.

The controller 137 is interfaced with the semiconductor switches in the first and second switch arrangements 135, 136. The controller 137 controls the conductive state of the semiconductors switches to selectively couple one of the input terminals 131, 132 to the load terminal 133. In an exemplary embodiment, the controller 137 is implemented as a microcontroller. In other embodiments, controller may refer to, be part of, or include an Application Specific Integrated Circuit (ASIC); an electronic circuit; a combinational logic circuit; a field programmable gate array (FPGA); a microprocessor that executes code; other suitable components that provide the described functionality; or a combination of some or all of the above.

Some of the primary components of the exemplary static transfer switch 130 are set forth above. It is readily understood that other components may be needed to construct and operate a static transfer switch. For further details regarding an exemplary static transfer switch, reference may be had to the Liebert STS2 static transfer switch commercially available from Emerson Network Power.

During operation, the controller 137 is configured to monitor operating parameters of the preferred voltage source and the alternate voltage source. For example, the load terminal 133 may be receiving power from the preferred voltage source, i.e., UPS 110. The controller 137 in turn monitors the amplitude and/or frequency of the voltage signal received from the UPS 110. When either parameter falls outside an acceptable range, the controller 137 may transfer from the preferred voltage source to the alternate voltage source. That is, the controller 137 electrically couples the alternate input terminal 131 to the load terminal 133 and uncouples the preferred input terminal 132 from the load terminal 133. To do so, the controller 137 controls the conductive state of the semiconductor switches. Specifically, the semiconductor switches in the first switch arrangement 135 are opened (i.e., non-conductive) and the semiconductor switches in the second switch arrangement 136 are closed (i.e., conductive). Thus, the controller 137 operates to selectively couple one of the preferred voltage source or the alternate voltage source to the load terminal in accordance with the monitored operating parameters.

When the preferred voltage source for the static transfer switch 130 is UPS 110, there can be a brief interruption in the voltage received from the UPS 110 while switching from economy mode to normal mode as noted above. In one aspect of this disclosure, operation of the static transfer switch 130 is improved during such voltage disturbances. Specifically, the static transfer switch 130 may be in data communication with the UPS 110. In this way, the static transfer switch 130 may be made aware that the voltage disturbance is temporary and thus a transfer to an alternate voltage source is not necessary.

Figure 3:
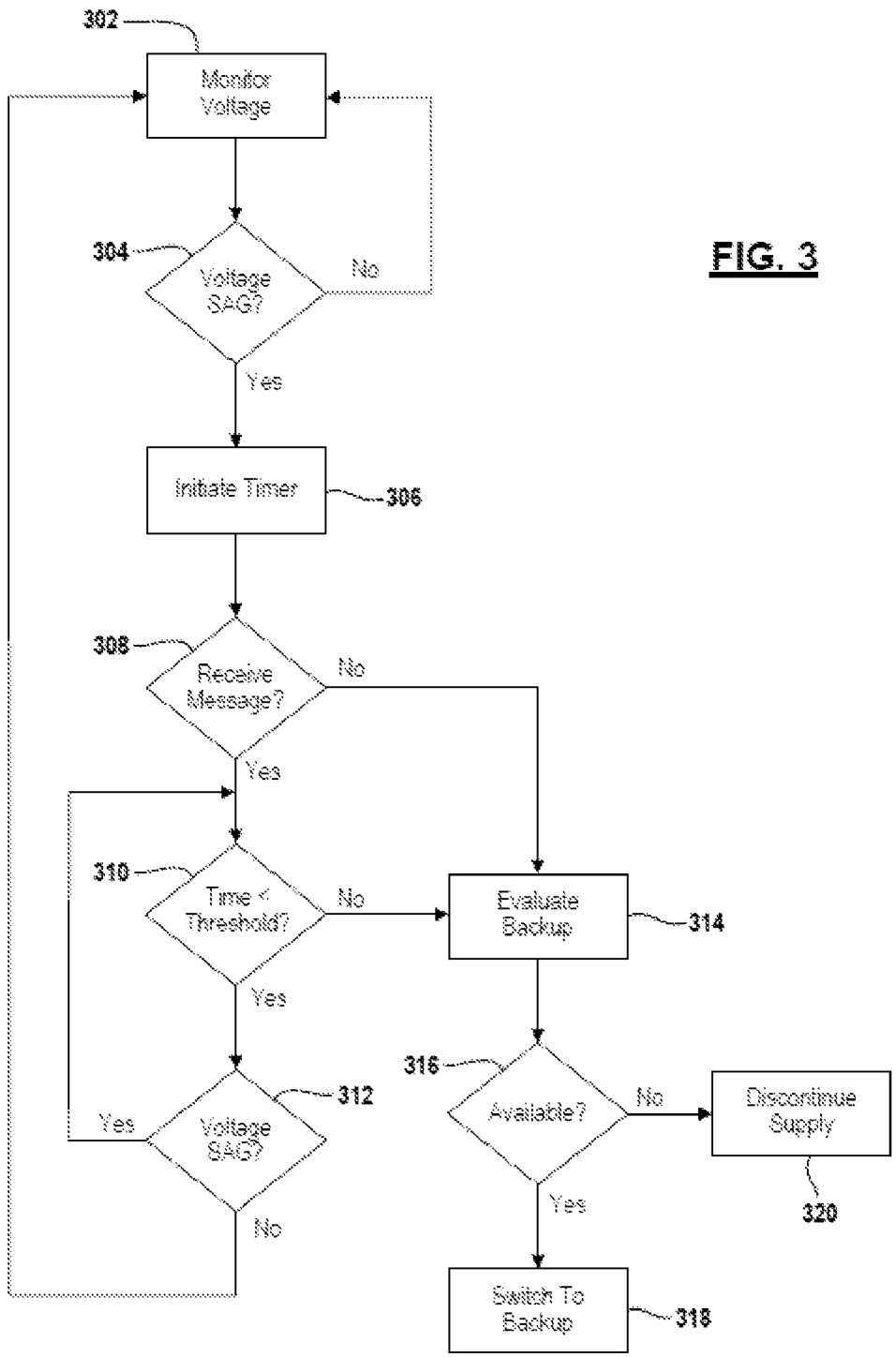
FIG. 3 is a flowchart depicting an exemplary technique for improving operation of a static transfer switch made aware of an upstream voltage disturbance.

FIG. 3 depicts an exemplary technique for improving operation of the static transfer switch 130 which is made aware of an upstream voltage disturbance by the UPS. During operation, the controller 137 monitors operating conditions at 302, for example of the voltage supplied by the preferred voltage source (i.e., UPS 110). The static transfer switch 130 continues to supply voltage from the UPS 110 to its load terminal 133 until it detects a disturbance in the voltage received from the UPS 110.

Upon detecting a disturbance at 304, the controller 137 initiates a timer as indicated at 306 and checks whether a message indicative of a voltage disturbance has been received from the UPS at 308. Specifically, the message may indicate that the UPS is transitioning from an economy mode to a normal mode and thus a temporary voltage disturbance can be expected by the static transfer switch. The controller 137 is configured to receive the message via a data port 138. In one embodiment, the static transfer switch 130 is configured with a serial data port and the controller 115 is in data communication with the serial data port. In this embodiment, the message may be sent serially by the UPS 110 via the data link to the controller 137 of the static transfer switch 130. It is understood that the message may be sent between the UPS 110 and static transfer switch 130 using other types of wired or wireless data links (e.g., parallel communication or Bluetooth wireless technology).

When a message has been received from the UPS, the controller 137 monitors the duration of the voltage disturbance. That is, the duration of the timer is compared at 310 to a threshold, where the value of the threshold correlates to an expected duration for the voltage disturbance (e.g., ¼ to ½ cycle). The controller 137 continues to monitor the duration of the voltage disturbance so long as the disturbance persists and the timer value is less than the threshold as indicated at 312. If the voltage disturbance persists for a period of time which exceeds the threshold, it is likely being caused by something other than the UPS transitioning from an economy mode to a normal mode and thereby necessitates the static transfer switch 130 to transition from the UPS to an alternate power supply, such as standby UPS 110. In this case, the controller 137 will evaluate switching to the alternate power supply as indicated at 314. Likewise, when a message has not been received by the UPS, the static transfer switch 130 is not expecting a voltage disturbance and thus the controller 137 will evaluate switching to the alternate power supply as indicated at 308.

On the other hand, if the incoming voltage resumes its nominal waveform as expected (i.e., before the timer value exceeds the threshold), then there is no need to transition from the UPS to the alternate power supply. In this case, the controller 137 resumes monitoring operating conditions as indicated at 302. By being made aware of the anticipated temporary voltage disturbance, the static transfer switch 130 avoids an unnecessary transfer from the preferred voltage source to the alternate voltage source.

The controller 137 evaluates various criteria before switching from the preferred voltage source over to the alternate voltage source. For example, the standby UPS 120 may be connected to ten (10) loads but can only supply three loads at any given time. In this example, the controller 137 may confer with the standby UPS 120 before switching over the standby UPS. In one embodiment, the controller 137 of the static transfer switch 130 may be configured to query the standby UPS 120 which in response sends a message to the controller 137 of the static transfer switch 130, where the message indicates the availability of the standby UPS 120 to supply another load. In some embodiments, the message sent by the standby UPS 120 may specify the power available (e.g., 600 amps) from the standby UPS 120 and the controller 137 in the static transfer switch 130 makes a determination to switch to the standby UPS 120 based on the available power. For example, when the available power exceeds the load demand being supplied by the static transfer switch, the static transfer switch can switch to the standby UPS. On the other hand, when the available power is less than the load demand, the static transfer switch would not switch the standby UPS. It is readily understood that the controller 137 may evaluate other types of criteria before switching to the alternate voltage source. In some instances, the controller 137 will switch to the alternate voltage source as indicated at 318. In other instances, the controller 137 will take down the load as indicated at 320. It is to be understood that only the relevant steps of the methodology are discussed in relation to FIG. 3, but that other software-implemented instructions may be needed to control and manage the overall operation of the static transfer switch.

Figure 4:
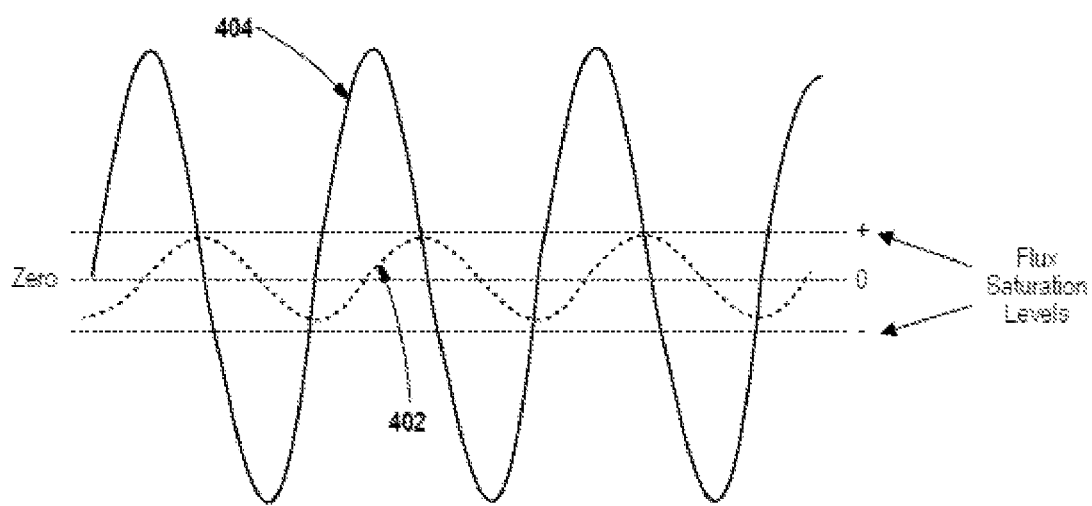
FIG. 4 is a graph illustrating the magnetic flux created in a transformer.
Figure 5:
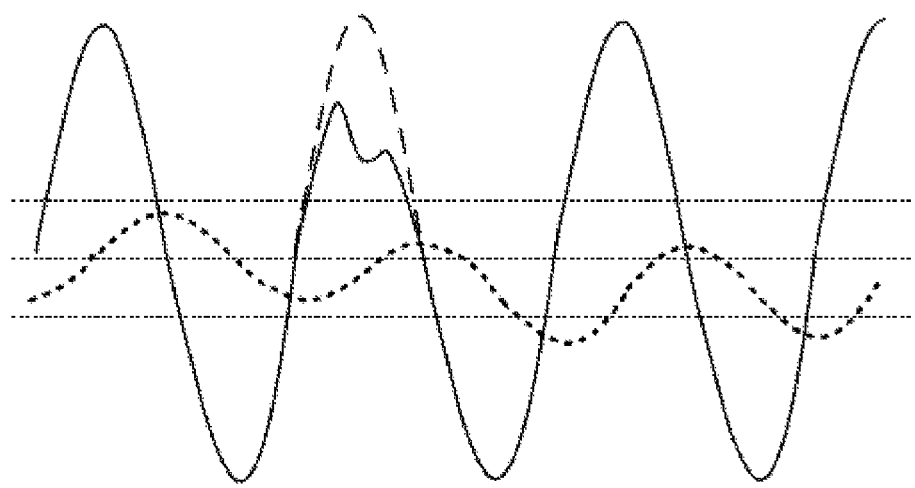
FIG. 5 is a graph illustrating how the transformer can become saturated when the voltage is unbalanced.
Figure 6:
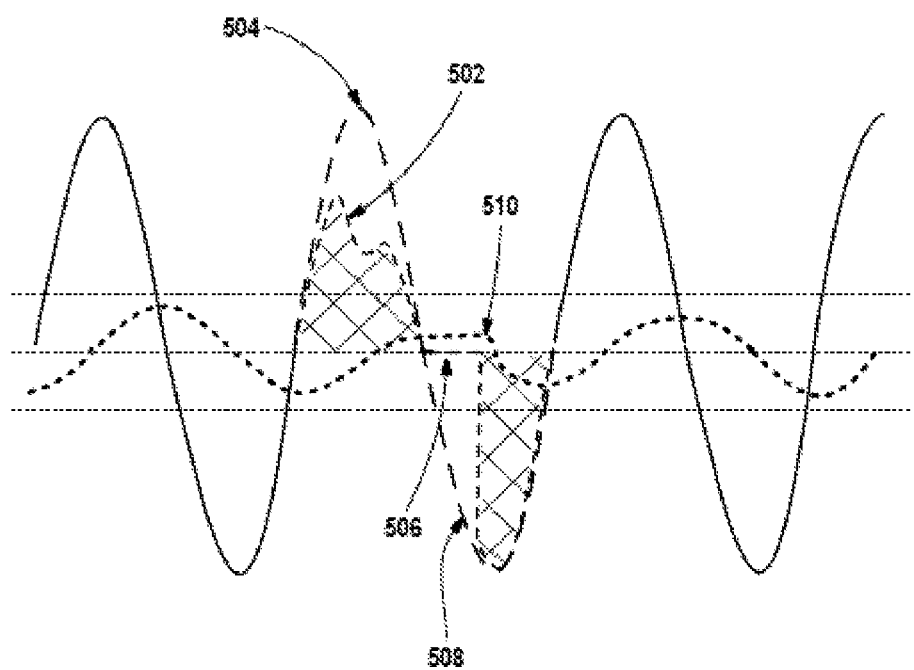
FIG. 6 is a graph illustrating how to modify the voltage waveform to avoid magnetic flux saturation in a downstream transformer.

With reference to FIG. 4, the transformer magnetic field (flux) 402 is created by the current which flows in the primary (input) winding of the transformer. This amount of flux is directly proportional to the integral of the applied voltage 404. Since the applied voltage is AC (alternates positive and negative), the direction of the magnetic field (flux) also alternates positive and negative, lagging the voltage by 90 degrees. This alternating magnetic field is what induces or generates the AC voltage in the secondary (output) winding of the transformer. This same alternative magnetic field also induces a voltage into the primary winding which opposes the applied voltage. This is called counter electromotive force (counter-EMF). It is this counter EMF which limits the current flow in the primary winding. A transformer is designed to accommodate a given magnitude of magnetic flux created by the specified primary winding voltage. Hence, a transformer can be "saturated" with excess flux if the voltage applied is improper. This can occur if the voltage is too large in magnitude. Or, since the flux is proportional to the integral of the voltage, excess flux can also be created by an "unbalanced" voltage that is not centered around zero as shown in FIG. 5. When flux saturation occurs, the magnetic field is no longer changing. Therefore, no counter EMF is induced in the primary winding. When this occurs, the transformer primary winding will exhibit a very low resistance, appearing as a virtual short circuit to the voltage source applied to the transformer. This causes very large currents to flow, possibly overloading the voltage source.

In another aspect of this disclosure, the static transfer switch may be configured to modify its output voltage waveform to avoid magnetic flux saturation in a downstream transformer. To do so, the controller is configured to determine the magnitude of voltage output during each half cycle of the voltage signal. The magnitude of voltage can be determined by sampling the voltage signal at a relatively high frequency (e.g., 200 samples per half cycle for a 60 Hertz voltage signal) and summing the samples, thereby yielding a measure of the area under the curve. Other means for calculating the magnitude of voltage is also contemplated by this disclosure.

Upon detecting a disturbance (i.e., a sag in the nominal voltage waveform) 502 in a given half cycle 504 of the voltage signal, the controller controls the conductive state of the semiconductor switches using phase fired control as shown in FIG. 5. That is, the controller places the semiconductor switches in a non-conductive state at 506 during the half cycle 508 immediately following the given half cycle (also referred to herein as the next half cycle). Given the magnitude of voltage output during the given half cycle, the controller controls the conductive state of the semiconductor switches such that the magnitude of voltage output during the next half cycle correlates to the amount of voltage sag. More specifically, the controller fires the silicon-controlled rectifiers at a phase angle 510 so that the magnitude of voltage output during the next half cycle is substantially equal to the magnitude of voltage output during the given (or preceding) half cycle. As a result, the magnetic flux remains centered around zero and saturation of the transformer is avoided.

In some embodiments, the static transfer switch may be configured to modify its output voltage waveform to avoid magnetic flux saturation in a downstream transformer when it has received a message from the UPS and detects a voltage disturbance. In other embodiments, the static transfer switch is configured to modify its output voltage waveform independent of the operating condition of the UPS. In other words, the controller of the static transfer switch is configured to monitor the input voltage signal for disruptions. Even without receiving a message from the UPS, the controller, upon detecting a voltage disturbance, can operate to modify its output voltage waveform in the manner described above to avoid magnetic flux saturation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A static transfer switch, comprising:
a preferred input terminal configured to receive an AC voltage signal from a preferred voltage source;
a data port configured to receive a message via a data link from a device associated with the preferred voltage source, where the message is indicative of a voltage disturbance in the voltage signal;
a load terminal;
a first switch arrangement electrically connected between the preferred input terminal and the load terminal and operates to selectively output the voltage signal to the load terminal, wherein the first switch arrangement includes one or more semiconductor switches; and
a controller configured to receive the message from the data port and operable, in response to receiving the message, to initiate a timer and compare duration of the timer to a threshold,
wherein the controller, in response to the duration being less than the threshold, to controls conductive state of the semiconductor switches to change waveform of the voltage signal output by the first switch arrangement to the load terminal, thereby avoiding magnetic flux saturation in a downstream transformer; and
wherein the controller, in response to the duration being greater than the threshold, couple an alternate input terminal to the load terminal, where the alternate input terminal is configured to receive an AC voltage signal from an alternate voltage source.

2. The static transfer switch of claim 1 wherein the controller detects the voltage disturbance in a given half cycle of the voltage signal and, in response to receiving the message and detecting the voltage disturbance, placing the semiconductor switches in a non-conductive state during a next half cycle of the voltage signal immediately following the given half cycle.

3. The static transfer switch of claim 2 wherein the controller determines a quantity of sag in nominal waveform of the voltage signal in a given half cycle of the voltage signal and controls conductive state of the semiconductor switches such that magnitude of voltage output by the first switch arrangement during the next half cycle correlates to the quantity of sag.

4. The static transfer switch of claim 3 wherein the controller controls the conductive state of the semiconductor switch during the next half cycle such that magnitude of voltage output by the first switch arrangement during the given half cycle is substantially equal to magnitude of voltage output by the first switch arrangement during the next half cycle.

5. The static transfer switch of claim 3 wherein the controller controls the conductive state of the semiconductor switches using phase fired control.

6. The static transfer switch of claim 1 wherein the preferred voltage source is further defined as an uninterruptible power supply (UPS) and the message indicates a transition from an economy mode of operation to a normal node of operation by the UPS.

7. The static transfer switch of claim 1 wherein the semiconductor switches are further defined as silicon controlled rectifiers.

8. The static transfer switch of claim 1 wherein the first switch arrangement is further defined as two silicon-controller rectifiers arranged in parallel with each other in a back-to-back configuration.

9. The static transfer switch of claim 8 wherein the controller operates to couple the alternate input terminal to the load terminal when the voltage disturbance in the voltage signal from the preferred voltage source exceeds a threshold time period.

10. The static transfer switch of claim 8 wherein the data port is configured to receive another message via a data link from a device associated with the alternate voltage source and the controller operates to couple the alternate input terminal to the load terminal based in part of the another message received.

11. The static transfer switch of claim 1 further comprises
an alternate input terminal configured to receive an AC voltage signal from an alternate voltage source; and
a second switch arrangement electrically connected between the alternate input terminal and the load terminal and operates to selectively output the voltage signal to the load terminal, wherein the second switch arrangement includes one or more semiconductor switches; wherein the controller is configured to monitor operating parameters of at least one of the preferred voltage source and the alternate voltage source and operates to selectively couple one of the preferred voltage source or the alternate voltage source to the load terminal in accordance with the monitored operating parameters.

12. A static transfer switch, comprising:
a preferred input terminal configured to receive an AC voltage signal from a preferred voltage source;
a load terminal;
a first switch arrangement electrically connected between the preferred input terminal and the load terminal and operates to selectively output the voltage signal to the load terminal, wherein the first switch arrangement includes one or more semiconductor switches; and
a controller configured to detect a voltage disturbance in a given half cycle of the voltage signal and operable, in response to detecting the voltage disturbance, to control conductive state of the semiconductor switches to change waveform during a next half cycle of the voltage signal immediately following the given half cycle, thereby avoiding magnetic flux saturation in a downstream transformer;
wherein the controller determines a quantity of sag in a nominal waveform of the voltage signal in the given half cycle of the voltage signal and controls conductive state of the semiconductor switches such that magnitude of voltage output to the load terminal during the next half cycle correlates to quantity of sag.

13. The static transfer switch of claim 12 wherein the controller controls the conductive state of the semiconductor switches during the next half cycle such that magnitude of voltage output to the load terminal during the next half cycle is substantially equal to magnitude of voltage output to the load terminal during the given half cycle.

14. The static transfer switch of claim 12 wherein the controller controls the conductive state of the semiconductor switches using phase fired control.

15. The static transfer switch of claim 12 further comprising
an alternate input terminal configured to receive an AC voltage signal from an alternate voltage source; and
a second switch arrangement electrically connected between the alternate input terminal and the load terminal and operates to selectively output the voltage signal to the load terminal wherein the second switch arrangement includes one or more semiconductor switches.

16. The static transfer switch of claim 15 wherein the controller is configured to monitor operating parameters of the preferred voltage source and the alternate voltage source and operates to selectively couple one of the preferred voltage source or the alternate voltage source to the load terminal in accordance with the monitored operating parameters.

* * * * *